US005301977A

United States Patent [19]

Schlosser et al.

[11] Patent Number: 5,301,977

[45] Date of Patent: Apr. 12, 1994

[54] METHOD AND APPARATUS FOR ADJUSTING TOE AND/OR CAMBER

[75] Inventors: Richard D. Schlosser, Loveland; Steve Johnson; Robert M. Allman, both of Longmont, all of Colo.

[73] Assignee: Specialty Products Company, Longmont, Colo.

[21] Appl. No.: 970,130

[22] Filed: Nov. 2, 1992

[51] Int. Cl.[5] .......... B62D 17/00

[52] U.S. Cl. .......... 280/661

[58] Field of Search .......... 280/661, 688, 690

[56] References Cited

U.S. PATENT DOCUMENTS

| | | | |
|---|---|---|---|
| 4,695,073 | 9/1987 | Pettibone | 280/690 |
| 4,733,884 | 4/1989 | Pettibone et al. | 280/661 |
| 4,948,160 | 8/1990 | Barry | 280/661 |
| 4,971,352 | 11/1990 | Jordan | 280/661 |
| 4,973,075 | 11/1990 | Rori | 280/661 |
| 4,989,894 | 2/1991 | Winsor | 280/690 |
| 5,104,142 | 4/1992 | Tsubota | 280/661 |

FOREIGN PATENT DOCUMENTS

| | | |
|---|---|---|
| 3200836 | 7/1983 | Fed. Rep. of Germany . |
| 1-63405 | 9/1989 | Japan . |

*Primary Examiner*—Margaret A. Focarino
*Assistant Examiner*—Paul Dickson
*Attorney, Agent, or Firm*—Klaas, Law, O'Meara & Malkin

[57] ABSTRACT

An adjustment system for providing toe and/or camber adjustment for a normally fixed wheel of a vehicle using a plate member, in conjunction with portions of the structures of the suspension system of the vehicle, to locate at least one center point for the formation of new aligned openings so that a portion of the control system may be moved from an original location and secured at a new location to provide for the toe and/or camber adjustment.

22 Claims, 1 Drawing Sheet

METHOD AND APPARATUS FOR ADJUSTING TOE AND/OR CAMBER

FIELD OF THE INVENTION

This invention relates generally to suspension systems for the mounting of wheels on a vehicle and more particularly to method and apparatus for adjusting the toe and/or camber in the non-steerable wheels of a vehicle having independent wheel suspension systems.

BACKGROUND OF THE INVENTION

In a conventional independent rear suspension system for an automotive vehicle, each rear wheel is mounted independently of the other, i.e., there is no common rear axle. Each rear wheel is rotatably mounted on a wheel spindle which is, in turn, fixedly bolted to the lower end of an elongate, generally vertically extending shock strut. The upper end of the shock strut is attached to a body side panel, typically by a rubber insulated top mount assembly with attachment bolts. Due to the length and resiliency of the shock strut, the spindle and attached tire are, to a small degree, displaceable in a direction perpendicular to the longitudinal axis of the shock strut and are also torsionally (twistably) displaceable about this axis if otherwise unrestrained. In order to restrain this movement and hold the wheel in a fixed orientation with respect to the vehicle frame, there is provided a control arm comprising a central portion affixed to the spindle and outwardly oppositely extending ends, each end being affixed to a bracket secured to the vehicle frame. Due to manufacturing tolerances etc. in the rear wheel assembly, the "toe" and "camber" of a rear wheel in some cases needs adjustment.

BRIEF DESCRIPTION OF THE INVENTION

This invention provides method and apparatus for adjusting the toe and/or camber of a normally fixed wheel by locating a center point on at least one of two spaced apart legs of a fixed bracket mounted on a portion of the frame of a vehicle so that a first new opening can be made in the at least one of the spaced apart legs so that when a control arm of the suspension system is moved to be in alignment with the new opening, a second new opening can be formed in the other of the spaced apart legs and a bolt is then passed through the first and second new openings and the control arm to obtain a desired toe and/or camber adjustment.

In a preferred embodiment of the invention, the method provides camber adjustment for a normally fixed wheel of a vehicle which normally fixed wheel is mounted on a central portion of a control means between and offset from two spaced apart inner and outer control arms. Each of the spaced apart inner and outer control arms has an opening, hereinafter referred to as a first opening, through which a bolt may be passed. A pair of spaced apart brackets are fixedly mounted on the subframe of the vehicle. Each of the spaced apart brackets has two outwardly projecting spaced apart legs, each having an opening, hereinafter referred to as a second opening, extending therethrough. The first opening in each control arm is aligned with the aligned second openings in one of the brackets and a bolt is passed through the aligned openings to secure the spaced apart control arms in the spaced apart brackets. The method of this application comprises removing the bolt from at least one of the brackets. The control arm is separated from at least one of the brackets. A center point is located on at least one of the spaced apart legs of the at least one of the brackets. If the center point is located on a vertical line passing through the center point of the second opening, only a camber adjustment will be made. If the center point is located on a horizontal line passing through the center point of the second opening, only a toe adjustment will be made. If the center point is located on an arc between the vertical and horizontal lines, both a toe and camber adjustment will be made. A third opening is formed in the at least one of the spaced apart legs using the center point to locate a drill. The first opening in the separated control arm is moved into alignment with the third opening. The drill is passed through the third and first openings and a third opening is formed in the other of the spaced apart legs. A bolt is passed through the aligned first and third openings to secure the control arm to the at least one of said brackets to provide for the toe and/or camber adjustment. In the preferred embodiment of the invention, the center point is located using at least one plate member. The plate member has a opening formed therein, hereinafter referred to as a fourth opening, oppositely facing generally planar surfaces and a pin projecting outwardly from at least one of the generally planar surfaces. The pin has a punch or drill guide hole formed therein. After the bolt has been removed, the at least one plate member is moved so that the fourth opening therein is aligned with one of the second openings. In view of the added length of the at least one plate member, another bolt of sufficient length is passed through the aligned second and fourth openings to secure the at least one plate member onto the at least one of the spaced apart legs. However, if the original bolt is long enough, it can be used. A center punch or pilot drill is passed through the punch or drill guide hole in the at least one plate member to form a center point. The at least one plate member is then removed. The third openings are then formed as disclosed above. The pin of the at least one plate member is placed in the second opening in the at least one of the spaced apart legs so that the third and fourth openings are in alignment. The another bolt is passed through the aligned third and fourth openings and the first opening in the control arm to secure the control arm to the at least one of the brackets at a new location to provide for the toe and/or camber adjustment.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
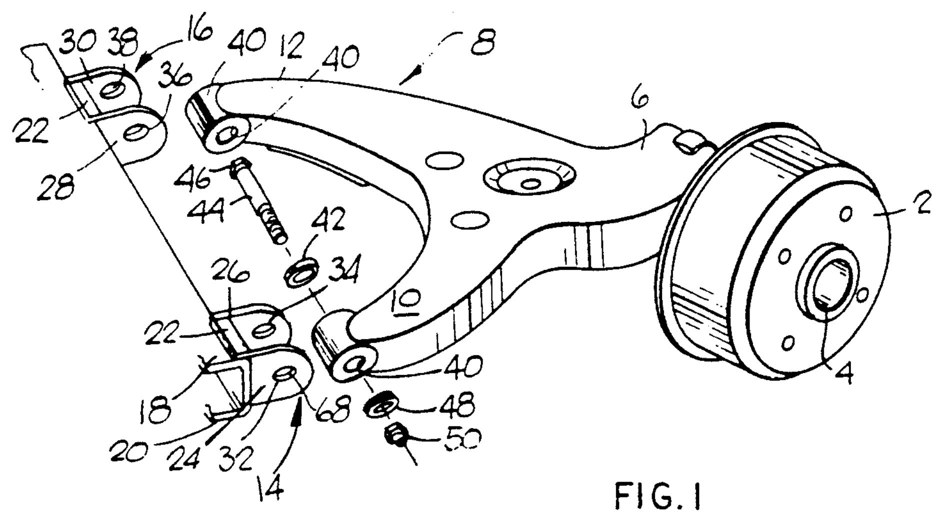
FIG. 1 is a schematic perspective illustration in an exploded view of a portion of a rear suspension on a commercially available vehicle.

In FIG. 1, there is an illustration in an exploded view of a portion of the rear suspension of a conventional motor vehicle. In FIG. 1, a wheel drum 2 is mounted on a spindle 4, which extends from the drive assembly (not shown) which rotates the spindle 4 to rotate the wheel drum 2. The spindle 4 is securely mounted in a central portion 6 of control means 8 so as to allow for rotational movement of the spindle 4, but no other relative movement between the spindle 4 and the central portion 6. Extending outwardly from the central portion 6 of the control means 8 are an outer control arm 10 and a inner control arm 12. As illustrated in FIG. 1, the outer control arm 10 is closer to the wheel drum 2 than the inner control arm 12. A pair of spaced apart brackets 14 and 16 are secured to a portion 18 of the frame of the vehicle. Each bracket has a portion 20 secured to the underside of the portion 18 and a base 22 secured to side of the portion 18 of the vehicle frame. Each bracket has a pair of spaced apart legs 24 and 26 on bracket 14 and 28 and 30 on bracket 16 extending outwardly from the base 22. Aligned openings 32, 34, 36 and 38 are provided respectively in the arms 24, 26, 28, 30. An opening 40 is formed in each of the inner and outer control arms 10 and 12.

The normal assembly of the control means 8 onto the vehicle is illustrated in FIG. 1 in an exploded view of the parts. The following explanation is directed to outer control arm 10 but is understood that the same assembly is used for inner control arm 12. A washer 42 is placed on the bolt 44 which is then inserted through opening 34 in the leg 26, opening 40 in the outer control arm 10 and opening 32 in the leg 24 so that the washer 42 is between the bolt head 46 and the leg 26. A washer 48 and a nut 50 are positioned on the threaded portion of the bolt 44 and the nut 50 is tightened so as to secure the outer control arm 10 in the bracket 14.

Figure 2:
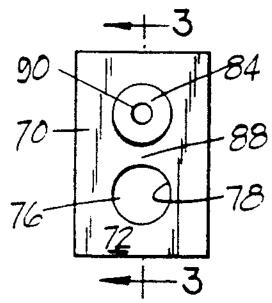
FIG. 2 is a front elevational view of a plate member of this invention.
Figure 3:
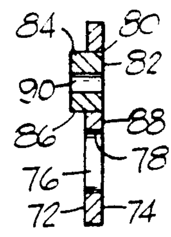
FIG. 3 is a cross-sectional view taken on the line 3—3 of FIG. 2.

The invention in this application is illustrated in FIGS. 2-8. In FIGS. 2 and 3 there is illustrated one plate member 70 having generally planar oppositely facing surfaces 72 and 74. An opening 76 having a generally cylindrical inner surface 78 is formed in the plate member 70 and has a diameter similar to the diameter of each of the openings 32, 34, 36 and 38. Another opening 80 is formed in the plate member 70 and has a pin 82 secured in the another opening 80 by suitable means, such as by welding (not shown). A portion 84 of the pin 82 projects outwardly from the generally planar surface 72. The portion 84 has a generally cylindrical outer surface 86 having a diameter similar to that of the bolt 44. The opening 80 is spaced from the opening 76 so that a portion 88 of the plate member 70 is located therebetween. A punch or drill guide hole 90 extends through the pin 82. The plate member 70 permits a limited toe and camber adjustment and a full camber adjustment in accordance with its dimensions as described below.

Figure 4:
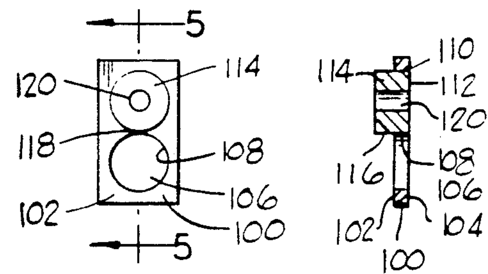
FIG. 4 is a front elevational view of another plate member of this invention.
Figure 5:
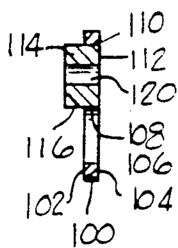
FIG. 5 is a cross-sectional view taken on the line 5—5 of FIG. 4.

Another plate member 100, similar to plate member 70 but having a substantially smaller perimeter, is illustrated in FIGS. 4 and 5 and has generally planar oppositely facing surfaces 102 and 104. An opening 106 having a generally cylindrical inner surface 108 is formed in the plate member 100 and has a diameter similar to the diameter of each of the openings 32, 34, 36 and 38. Another opening 110 is formed in the plate member 100 and has a pin 112 secured in the another opening 112 by suitable means, such as by welding (not shown). A portion 114 of the pin 110 projects outwardly from the generally planar surface 102. The portion 114 has a generally cylindrical outer surface 116 having a diameter similar to that of the bolt 58. The opening 110 is tangent at 118 to the opening 106. A punch or drill guide hole 120 extends through the pin 112. The plate member 100 permits a limited toe and camber adjustment, a full camber adjustment and a full toe adjustment in accordance with its dimensions as described below.

Figure 6:
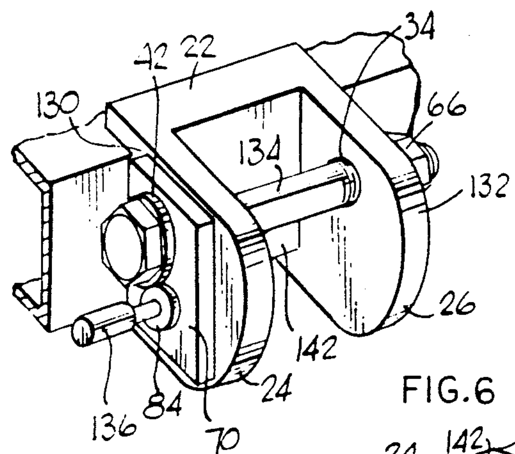
FIG. 6 is a perspective view showing the use of the plate member.
Figure 7:
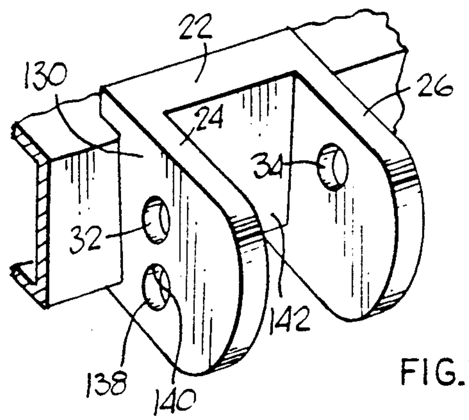
FIG. 7 is a perspective view of the bracket after the new opening has been formed therein.
Figure 8:
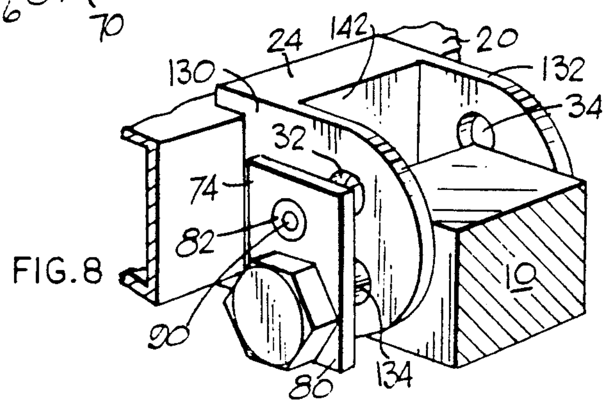
FIG. 8 is a perspective exploded view showing the adjustment about to be completed.

In accordance with a preferred embodiment, a modification is made to the outer bracket 14 to obtain the toe and/or camber adjustment. The nut 50 and washer 48 are removed and the bolt 44 and washer 40 are removed so that the outer control arm 10 may be moved from its location between the legs 24 and 26, as illustrated in FIG. 6. A plate member 70 is positioned against the outer surface 130 of the leg 24 so that the openings 76 and 32 ar in alignment. If the bolt 44 does not have a length to accommodate the addition of the plate member 70, another bolt 134 of sufficient length is passed through the aligned openings 76, 32 and 34 and the nut 50 is loosely threaded onto the bolt 134. The plate member 70 is positioned so that the center of the punch or drill guide hole 90 is located as described above to obtain the desired camber, toe or toe and camber adjustment. The nut 50 is then tightened. A center punch 136 or pilot drill (not shown) is then passed through the punch or drill guide hole 90 in the pin 82 and a force is applied thereto to form a punch mark or hole (not shown). The nut 50, washers 48 and 42, the bolt 44 and the plate member 70 are removed. An opening 138, as illustrated in FIG. 7, is then formed in the leg 24 using the punch mark or drill hole formed as described above and preferably a drill (not shown). The opening 138 has a generally cylindrical inner surface 140.

The plate member 100 is used in the same manner as the plate member 80. However, the amount of toe an/or camber adjustment obtained by using the plate member 100 is less than the toe and/or camber adjustment obtained by using the plate member 80.

The toe and/or camber adjustment is obtained by moving the outer control arm 10 back to a position between the legs 24 and 26 s that the opening 40 is aligned with the opening 138. A drill is then passed through the opening 138 and the opening 40 and another opening 138 is formed in the leg 26. The drill is removed and a plate member 70 is attached to the leg 24 by inserting the pin 82 into the opening 32. The bolt 134 is passed through the aligned openings 76, 138, 40 and 138 and the nut 50 is threaded onto the bolt 134 and torqued to specification. The plate member 70 adds stability to the adjusted outer control arm 10. If desired, the inner control arm 12 can be adjusted in the same way.

Figure 9:
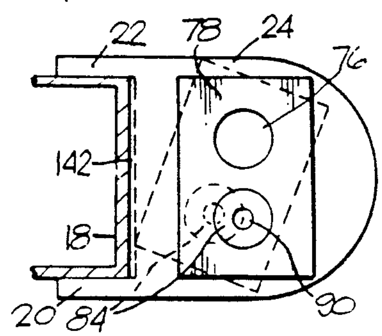
FIG. 9 is a partial side elevational view illustrating the invention.

The possible adjustments for the plate member 70 is illustrated in FIG. 9. A full camber adjustment is obtained when the center of the punch or drill guide hole 90 lies on a vertical line passing through the center of the opening 32 as illustrated by the solid line in FIG. 9. The amount of camber adjustment is governed by the distance between the center of the opening 76 and the center of the punch or drill guide hole 90. As illustrated in FIG. 9, limited toe and camber adjustments may be made by rotating the plate member 70 in a clockwise direction, illustrated by the dashed lines, or in a counter-clockwise direction (not illustrated). Rotation of the plate member 70 is limited by contact with the wall 142 of the bracket 14. The plate member 100 has a perimeter substantially smaller than the plate member 70. Therefore, the plate member 100 may be rotated to obtain a full toe adjustment, in addition to the full camber adjustment, by locating the center of the punch or drill guide hole 90 on a horizontal line passing through the center of the opening 32. If there is sufficient distance between the center of the opening 32 and the wall 142, the plate member 70 can be used in the same manner. Also, the corners of the plate members 70 and 100 can be rounded to provide for larger separation of the centers of the opening 76 or 106 and the punch or drill guide hole 90 or 110.

If desired, two plate members 70 may be used to form center points and then openings 138 in the legs 24 and 26 and the two plate members 70 may be used in making the final camber adjustment.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method for providing toe and/or camber adjustment for a normally fixed wheel of a vehicle which normally fixed wheel is mounted on a central portion of a control means between and offset from two spaced apart control arms wherein each of the spaced apart control arms has a first opening through which a bolt may be passed and a pair of spaced apart brackets are fixedly mounted on the subframe of the vehicle and wherein each of the spaced apart brackets has two outwardly projecting spaced apart legs, each having a second opening extending therethrough and wherein said second openings are in alignment and wherein the first opening in each control arm is aligned with the aligned second openings in one of the brackets and a bolt is passed through the aligned openings to secure the spaced apart arms in the spaced apart brackets comprising:

removing said bolt from at least one of said brackets;

separating at least one of said control arms from said at least one of said brackets;

forming a center point on at least one of said spaced apart legs of said at least one of said brackets with said center point being located on an arc of a circle concentric with said second opening in said at least one of said spaced apart legs and having a radius greater than the radius of said second opening;

forming a third opening in said at least one of said spaced apart legs using said center point;

moving said first opening in said at least one of said control arms into alignment with said third opening;

forming another third opening in the other of said spaced apart legs; and passing said bolt through said third openings in said spaced apart legs and said first opening in said at least one of said control arms and securing said bolt to said at least one of said brackets to provide for the toe and/or camber adjustment.

2. The method as in claim 1 and further comprising:

using a new bolt to be passed through said third openings and said first opening in said control arm.

3. The method as in claim 1 and further comprising:

spacing said third openings from said second openings so that a portion of each of said spaced apart legs is located therebetween.

4. The method as in claim 1 and further comprising:

rotating a plate member to locate said center point for said third opening.

5. The method as in claim 1 and further comprising:

providing at least one plate member having a fourth opening formed therein, oppositely facing generally planar surfaces and a pin projecting outwardly from one of said generally planar surfaces and having a hole formed therein;

moving said plate member, after said bolt has been removed, so that the fourth opening is aligned with said second opening in said at least one of said spaced apart legs;

reinstalling said bolt so that it passed through said second and fourth openings; and passing an object through said hole to indicate the location of the center for said third opening.

6. The method as in claim 5 and further comprising:

passing hole forming means through said third and first openings to form said another third opening in the other of said spaced apart legs.

7. A method for providing toe and/or camber adjustment for a normally fixed wheel of a vehicle which normally fixed wheel is mounted on a central portion of a control means between and offset from two spaced apart control arms wherein each of the spaced apart control arms has a first opening through which a bolt may be passed and a pair of spaced apart brackets are fixedly mounted on the subframe of the vehicle and wherein each of the spaced apart brackets has two outwardly projecting spaced apart legs, each having a second opening extending therethrough and wherein said second openings are in alignment and wherein the first opening in each control arm is aligned with the aligned second openings in one of the brackets and a bolt is passed through the aligned openings to secure the spaced apart arms in the spaced apart brackets comprising:

removing said bolt from at least one of said brackets;

separating at least one of said control arms from said at least one of said brackets;

locating a center point on each of said spaced apart legs of said at least one of said brackets with each of said center points being located on an arc of a circle concentric with one of said spaced apart aligned second openings and having a radius greater than the radius of said second opening;

forming a third opening in each of said spaced apart legs;

moving said first opening in said at least one of said control arms into alignment with said third openings; and passing said bolt through said third openings and said first opening in said at least one of said control arms and securing said bolt to said at least one of said brackets to provide for the toe and/or camber adjustment.

8. The method as in claim 7 and further comprising:

providing at least two plate members with each of said plate members having a fourth opening formed therein, each having oppositely facing generally planar surfaces, and a pin projecting outwardly from at least one of said generally planar surfaces and having a hole formed therein;

moving each of said at least two plate members, after said bolt has been removed, so that each of said fourth openings is aligned with one of said second openings;

passing another bolt through said aligned second and fourth openings and securing said plate members onto said spaced apart legs;

passing an object through said hole in each of said at least two plate members to indicate the location of the centers of said third openings; and removing said at least two plate members.

9. The method as in claim 8 and further comprising:

placing said pins in said second openings so that said third and fourth openings are in alignment; and passing said another bolt through said aligned third and fourth openings and said first opening in said control arm and securing it to said at least one of said brackets at a new location to provide for the toe and/or camber adjustment.

10. The method as in claim 9 wherein the second openings having generally cylindrical inner surfaces the first opening in said control arm having a generally cylindrical inner surface and the bolt has a generally cylindrical outer surface and further comprising:

forming said third openings to have generally cylindrical inner surfaces.

11. Apparatus for providing toe and/or camber adjustment for a normally fixed wheel of a vehicle which normally fixed wheel is mounted on a central portion of a control means between and offset from two spaced apart control arms wherein each of the spaced apart control arms has a first opening through which a bolt may be passed and a pair of spaced apart brackets are fixedly mounted on the subframe of the vehicle and wherein each of the spaced apart brackets has two outwardly projecting spaced apart legs, each having a second opening extending therethrough and wherein said second openings are in alignment and wherein the first opening in each control arm is aligned with the aligned second openings in one of the brackets and a bolt is passed through the aligned openings to secure the spaced apart arms in the spaced apart brackets comprising:

locating means for locating a center point on at least one of said spaced apart legs of at least one of said brackets with said center point being located on an arc of a circle concentric with said second opening in said at least one of said spaced apart legs and having a radius greater than the radius of said second opening; and mounting means for mounting said locating means on said at least one of said spaced apart legs for rotational movement relative thereto.

12. Apparatus as in claim 11 wherein:

said third openings are spaced from said second openings so that a portion of each of said spaced apart legs is located therebetween.

13. Apparatus as in claim 11 wherein said locating means comprises:

at least one plate member having a punch hole formed therein so that an object may be passed therethrough to indicate the location of the center point for one of said openings.

14. Apparatus as in claim 13 wherein:

said spaced apart legs have generally planar outer surfaces;

said at least one plate member having oppositely facing generally planar surfaces for engagement with at least one of said generally planar outer surfaces of said spaced apart legs; and said at least one plate member having a fourth opening formed therein so that said at least one plate member can be mounted on said bolt so that the center point of said punch hole lies on said arc of a circle.

15. Apparatus as in claim 14 wherein:

said at least one plate member having a pin projecting outwardly from one of said oppositely facing generally planar surfaces; and said pin having said hole formed therein.

16. Apparatus as in claim 11 wherein said locating means comprises:

at least two plate members each having a punch hole formed therein so that an object may be passed therethrough to indicate the location of the centers for said third openings.

17. Apparatus as in claim 16 wherein:

said spaced apart legs have generally planar outer surfaces;

each of said at least two plate members having oppositely facing generally planar surfaces for engagement with said outer generally planar surfaces of said spaced apart legs; and each of said at least two plate members having a fourth opening formed therein so that each of said at least two plate members can be mounted on said bolt so that the center point of said punch hole lies on said arc of a circle.

18. Apparatus as in claim 17 wherein:

each of said at least two plate members having a pin projecting outwardly from one of said oppositely facing generally planar surfaces; and said pin having said hole formed therein.

19. Apparatus as in claim 18 wherein:

said pin on one of said at least two plate members is located in one of said second openings in one of said spaced apart legs and said pin on the other of said at least two plate members is located in the other of said second openings in the other of said spaced apart legs; and a bolt is passed through said first, third and fourth openings to secure said control arm in the desired toe and/or camber adjustment.

20. Apparatus as in claim 19 wherein:

said first, second, third and fourth openings have cylindrical inner surfaces; and said bolt has a cylindrical outer surface.

21. The method as in claim 1 and further comprising:

forming said another third opening by passing a rotatable drill through said aligned first and third openings.

22. Apparatus as in claim 11 wherein:

said at least one of said spaced apart legs having a third opening formed therein and having a longitudinal axis coinciding with the location of said center point; and the other of said spaced apart legs having another third opening formed therein and having a longitudinal axis in alignment with said longitudinal axis of said third opening.

* * * * *

UNITED STATES PATENT AND TRADEMARK OFFICE
CERTIFICATE OF CORRECTION

PATENT NO. : 5,301,977

DATED : April 12, 1994

INVENTOR(S) : Richard Schlosser et al.

It is certified that error appears in the above-identified patent and that said Letters Patent is hereby corrected as shown below:

Column 4, line 23, "ar" should read --are--;
line 42, "an/or" should read --and/or--; and
line 48, "s" should read --so--.

Claim 1, Column 5, line 58, "moving said first opening" should read --moving one of said first openings--; and
line 64, "opening" should read --openings--.
Claim 2, Column 6, line 1, insert --aligned-- between "said" and "third".

Signed and Sealed this

Sixth Day of September, 1994

Attest:

BRUCE LEHMAN

*Attesting Officer* *Commissioner of Patents and Trademarks*